United States Patent [19]
Kingston

[11] Patent Number: 6,058,648
[45] Date of Patent: May 9, 2000

[54] ARTIFICIAL FLOWER BLOOM INSERT

[76] Inventor: James Kevin Kingston, 104-2560 Departure Bay Road, Nanaimo, BC, Canada, V9S 5P1

[21] Appl. No.: 09/082,684

[22] Filed: May 21, 1998

[51] Int. Cl.⁷ .................................................. A01G 5/00
[52] U.S. Cl. .............................. 47/41.15; 428/17; 428/24
[58] Field of Search ............................ 47/41.15; 428/17, 428/24

[56] References Cited

U.S. PATENT DOCUMENTS

| | | | |
|---|---|---|---|
| D. 95,019 | 4/1935 | Cooperstein | 47/41.15 |
| D. 95,021 | 4/1935 | Cooperstein | 47/41.15 |
| 899,852 | 9/1908 | Warner | 428/24 |
| 2,514,177 | 7/1950 | Brown, Jr. | 428/24 |
| 2,602,250 | 7/1952 | Raising | 428/24 |
| 3,452,476 | 7/1969 | Kise | 428/24 |
| 4,584,213 | 4/1986 | Rentowl | 47/41.15 |
| 4,600,612 | 7/1986 | Litwin et al. | 428/24 |
| 4,937,109 | 6/1990 | Lin | 428/24 |

Primary Examiner—Michael J. Carone

[57] ABSTRACT

A new artificial flower bloom insert for inserting into a stem of a live plant to simulate a bloom of the plant. The inventive device includes a bloom portion formed to resemble a flower bloom and an elongate tubular stem portion coupled to the flower bloom at one end of the stem portion. The other end of the stem portion is adapted for insertion into a stem of a plant.

6 Claims, 2 Drawing Sheets

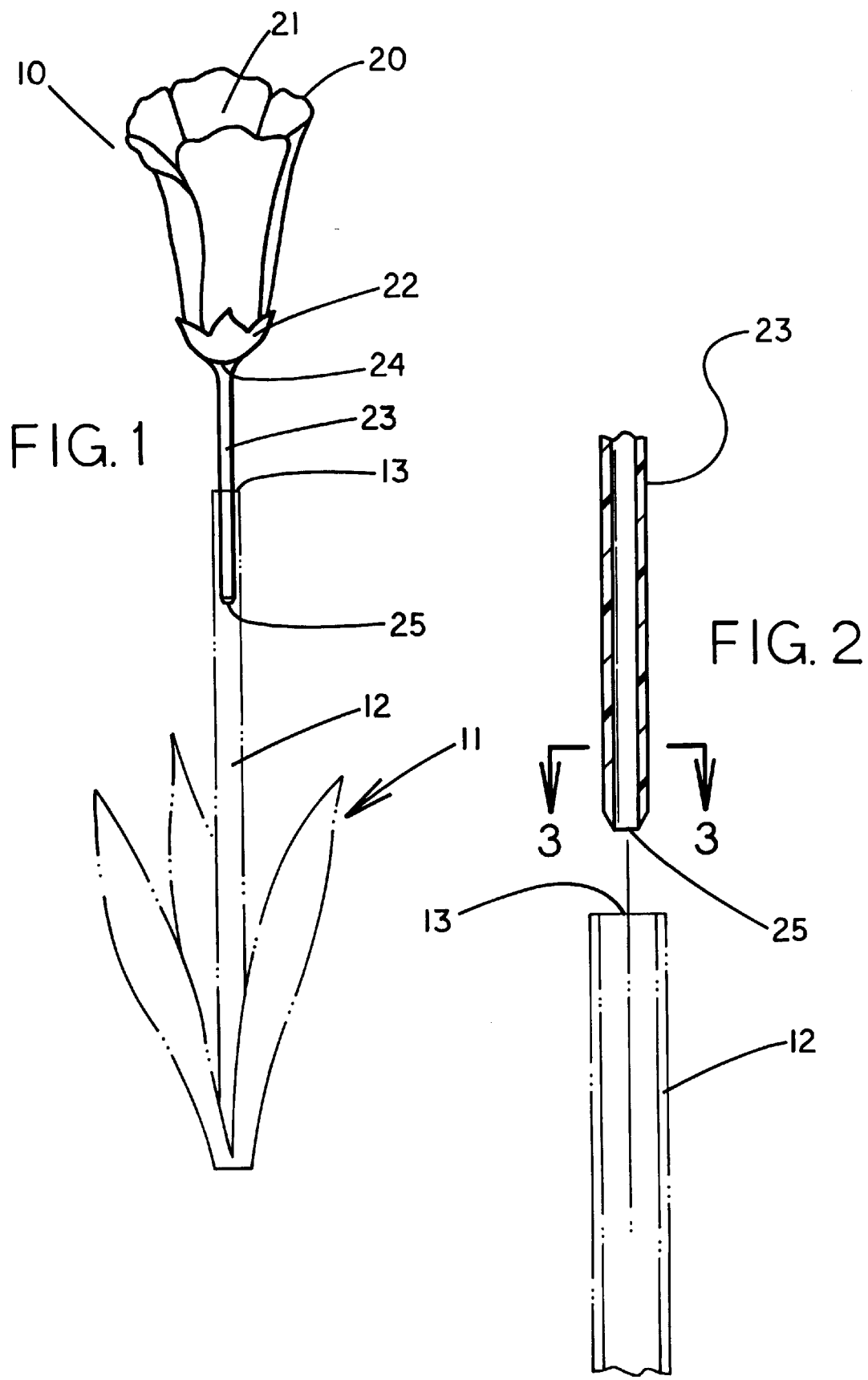

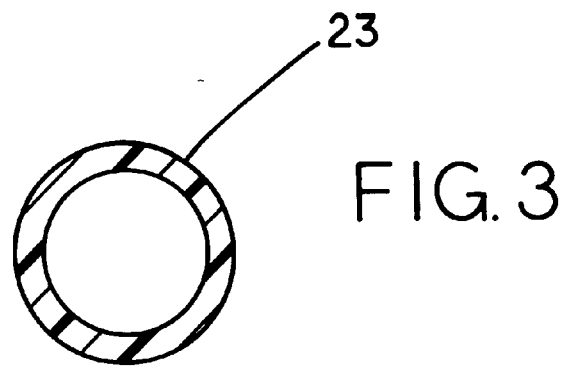
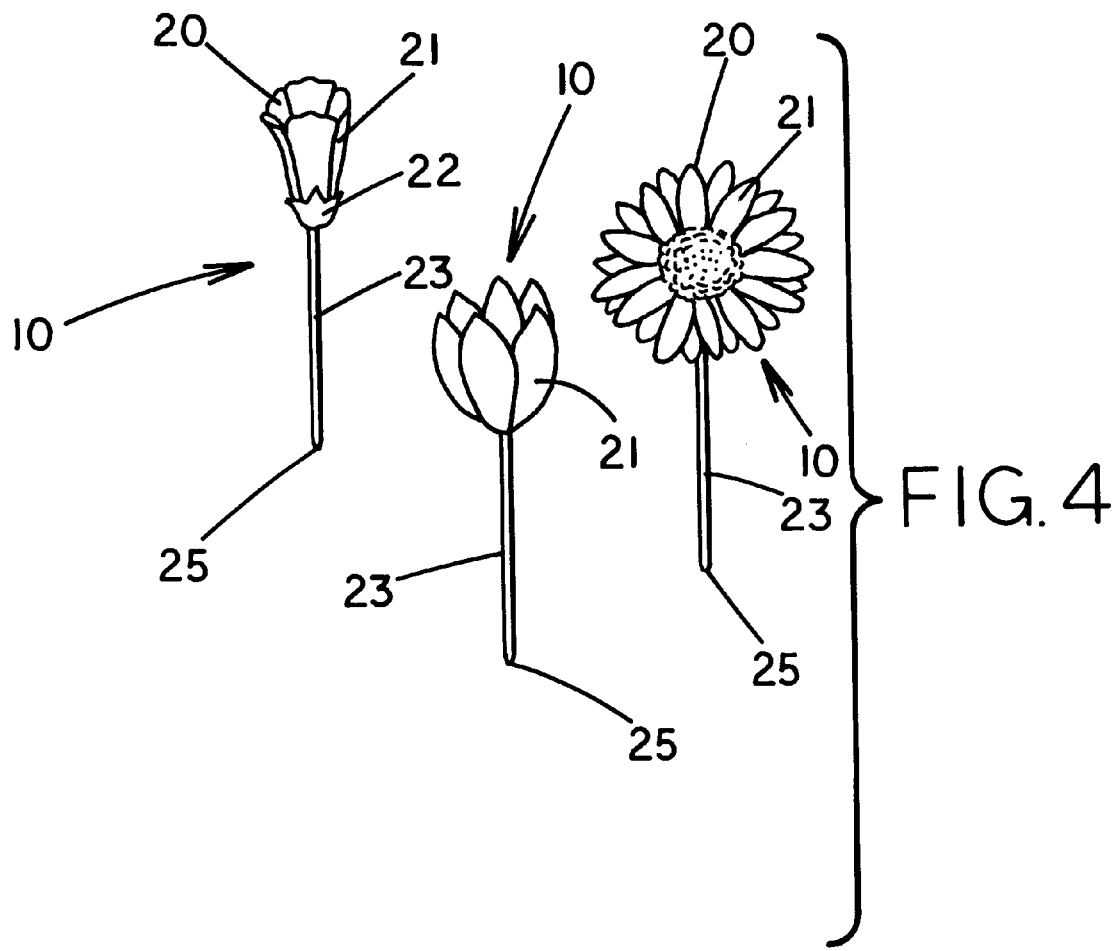

ARTIFICIAL FLOWER BLOOM INSERT

BACKGROUND OF THE INVENTION

1. Field of the Invention

The present invention relates to artificial flowers and more particularly pertains to a new artificial flower bloom insert for inserting into a stem of a live plant to simulate a bloom of the plant.

2. Description of the Prior Art

The use of artificial flowers is known in the prior art. More specifically, artificial flowers heretofore devised and utilized are known to consist basically of familiar, expected and obvious structural configurations, notwithstanding the myriad of designs encompassed by the crowded prior art which have been developed for the fulfillment of countless objectives and requirements.

Known prior art artificial flowers include U.S. Pat. Nos. 5,099,604; 3,041,766; Des. 246,232; 5,395,664; 4,937,109; and 501,134.

While these devices fulfill their respective, particular objectives and requirements, the aforementioned patents do not disclose a new artificial flower bloom insert. The inventive device includes a bloom portion formed to resemble a flower bloom and an elongate tubular stem portion coupled to the flower bloom at one end of the stem portion. The other end of the stem portion is adapted for insertion into a stem of a plant.

In these respects, the artificial flower bloom insert according to the present invention substantially departs from the conventional concepts and designs of the prior art, and in so doing provides an apparatus primarily developed for the purpose of inserting into a stem of a live plant to simulate a bloom of the plant.

SUMMARY OF THE INVENTION

In view of the foregoing disadvantages inherent in the known types of artificial flowers now present in the prior art, the present invention provides a new artificial flower bloom insert construction wherein the same can be utilized for inserting into a stem of a live plant to simulate a bloom of the plant.

The general purpose of the present invention, which will be described subsequently in greater detail, is to provide a new artificial flower bloom insert apparatus and method which has many of the advantages of the artificial flowers mentioned heretofore and many novel features that result in a new artificial flower bloom insert which is not anticipated, rendered obvious, suggested, or even implied by any of the prior art artificial flowers, either alone or in any combination thereof.

To attain this, the present invention generally comprises a bloom portion formed to resemble a flower bloom and an elongate tubular stem portion coupled to the flower bloom at one end of the stem portion. The other end of the stem portion is adapted for insertion into a stem of a plant.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new artificial flower bloom insert apparatus and method which has many of the advantages of the artificial flowers mentioned heretofore and many novel features that result in a new artificial flower bloom insert which is not anticipated, rendered obvious, suggested, or even implied by any of the prior art artificial flowers, either alone or in any combination thereof.

It is another object of the present invention to provide a new artificial flower bloom insert which may be easily and efficiently manufactured and marketed.

It is a further object of the present invention to provide a new artificial flower bloom insert which is of a durable and reliable construction.

An even further object of the present invention is to provide a new artificial flower bloom insert which is susceptible of a low cost of manufacture with regard to both materials and labor, and which accordingly is then susceptible of low prices of sale to the consuming public, thereby making such artificial flower bloom insert economically available to the buying public.

Still yet another object of the present invention is to provide a new artificial flower bloom insert which provides in the apparatuses and methods of the prior art some of the advantages thereof, while simultaneously overcoming some of the disadvantages normally associated therewith.

Still another object of the present invention is to provide a new artificial flower bloom insert for inserting into a stem of a live plant to simulate a bloom of the plant.

Yet another object of the present invention is to provide a new artificial flower bloom insert which includes a bloom portion formed to resemble a flower bloom and an elongate tubular stem portion coupled to the flower bloom at one end of the stem portion. The other end of the stem portion is adapted for insertion into a stem of a plant.

Still yet another object of the present invention is to provide a new artificial flower bloom insert that keeps a simulated bloom on a flower long after the real bloom of the plants has died.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new artificial flower bloom insert inserted into a stem of a plant according to the present invention.

FIG. 2 is a schematic partial sectional view of the free end of the stem portion of the present invention being inserted into the cut end of a stem of a plant.

FIG. 3 is a schematic sectional view of the stem portion of the present invention as seen from line 3—3 of FIG. 2.

FIG. 4 is a schematic side view of the present invention illustrating various types forms of the flower bloom portion.

DESCRIPTION OF THE PREFERRED EMBODIMENT

With reference now to the drawings, and in particular to FIGS. 1 through 4 thereof, a new artificial flower bloom insert embodying the principles and concepts of the present invention and generally designated by the reference numeral 10 will be described.

As best illustrated in FIGS. 1 through 4, the artificial flower bloom insert 10 generally comprises a bloom portion 20 formed to resemble a flower bloom and an elongate tubular stem portion 23 coupled to the flower bloom at one end 24 of the stem portion 23. The other end 25 of the stem portion 23 is adapted for insertion into a stem of a plant 11.

In closer detail, the artificial flower bloom insert 10 comprises a bloom portion 20 formed to resemble a flower bloom such as, for example: a tulip bloom, a daisy bloom or a rose bloom. The bloom portion 20 has a plurality of artificial petals 21 which are formed to resemble the petals of a flower bloom. The bloom portion 20 also has an artificial base 22 formed to resemble the base of a natural flower bloom. Preferably, the bloom portion 20 comprises silk and/or plastic.

The insert 10 also includes an elongate tubular stem portion 23 having a pair of opposite ends 24,25. One of the ends 24 of the stem portion 23 is coupled to the base 22 of the bloom portion 20 such that the stem portion 23 outwardly extends from the base 22 of the bloom portion 20. Another end 25 of the stem portion 23 is adapted for insertion into a stem of a living plant 11. Preferably, the other end 25 of the stem portion 23 tapers to a point to aid the insertion of the other end into a stem of a living plant 11.

The length of the stem portion 23 is defined between the ends 24,25 of the stem portion 23. Preferably, the length of the stem portion 23 is greater than about 1 inch. Ideally, the length of the stem portion 23 is about 3½ inches.

In use, a plant 11 having a stem 12 is provided. Preferably, the stem 12 has a dead or dying bloom on it. A portion of the stem 12 of the plant 11 (including the dead or dying bloom if it is provided on the stem 12) is removed from the top of the stem 12 of the plant 11 to form a cut end 13 on the remainder of the stem 12 of the plant 11. The free end 25 of the stem portion 23 of the artificial flower bloom insert 10 is inserted into the cut end 13 of the remainder of the stem 12 of the plant 11 such that the artificial flower bloom insert 10 resembles a flower bloom on the stem 12 of the plant 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An artificial flower bloom insert for inserting into a stem of a plant, said insert comprising:

a bloom portion being formed to resemble a flower bloom; and an elongate tubular stem portion having a hollow interior and a pair of opposite ends, one of said ends of said stem portion being coupled to said bloom portion, another end of said stem portion being adapted for insertion into a stem of a plant wherein a stem of a plant retains an authentic appearance up to said bloom portion;

wherein said other end of said stem portion has a beveled ring to aid the insertion of said other end into a stem of a plant.

2. The artificial flower bloom insert of claim 1, wherein said bloom portion has a plurality of petals and a base, said one of said ends of said stem portion being coupled to said base of said bloom portion.

3. The artificial flower bloom insert of claim 1, wherein said stem portion has a length, wherein said length of said stem portion is greater than about 1 inch.

4. The artificial flower bloom insert of claim 3, wherein said length of said stem portion is about 3½ inches.

5. An artificial flower bloom insert comprising:

a plant having a stem;

a bloom portion being formed to resemble a flower bloom, said bloom portion having a plurality of petals and a base;

an elongate tubular stem portion having a hollow interior and a pair of opposite ends, a length defined between said ends of said stem portion, one of said ends of said stem portion being coupled to said base of said bloom portion, another end of said stem portion being for insertion into said stem of said plant, said other end of said stem portion having a beveled ring to aid the insertion of said other end into said stem of said plant wherein a stem of a plant retains an authentic appearance up to said bloom portion; and wherein said length of said stem portion is greater than about 1 inch, wherein said length of said stem portion is about 3½ inches.

6. A method of inserting an artificial flower bloom insert into a plant comprising the steps of:

providing an artificial flower bloom insert comprising:
- a bloom portion being formed to resemble a flower bloom; and
- an elongate tubular stem portion having a hollow interior and a pair of opposite ends, one of said ends of said stem portion being coupled to said bloom portion, another end of said stem portion being adapted for insertion into a stem of a plant;

providing a plant having a stem;

removing a portion of said stem of said plant from the top of the stem of the plant to form a cut end on the remainder of said stem of said plant; and inserting said other end of said stem portion of said artificial flower bloom insert into said cut end of the remainder of said stem of said plant such that said artificial flower bloom insert resembles a flower bloom on said stem of said plant.

* * * * *